United States Patent [19]

Daghe et al.

[11] Patent Number: 4,690,019
[45] Date of Patent: * Sep. 1, 1987

[54] OPERATING WRENCH FOR TAMPERPROOF HYDRANTS

[75] Inventors: Joseph L. Daghe; Dennis W. Humes, both of Decatur; Mervin D. Stanley, Stonington; Gary L. Bouc, Decatur, all of Ill.

[73] Assignee: Mueller Co., Decatur, Ill.

[*] Notice: The portion of the term of this patent subsequent to Nov. 26, 2002 has been disclaimed.

[21] Appl. No.: 798,287

[22] Filed: Nov. 15, 1985

Related U.S. Application Data

[63] Continuation-in-part of Ser. No. 736,831, May 22, 1985, Pat. No. 4,554,944.

[51] Int. Cl.⁴ .............................................. B25B 13/28
[52] U.S. Cl. ......................................... 81/99; 81/111; 81/177.85; 81/185.1; 81/186; 137/382.5; 137/296
[58] Field of Search ..................... 81/98, 99, 111, 112, 81/176.15, 176.2, 186, 185.1, 177.85, 124.7, 100; 137/296, 382.5, 800

[56] References Cited

U.S. PATENT DOCUMENTS

| | | | |
|---|---|---|---|
| 1,068,771 | 7/1913 | Holmes | 81/99 |
| 2,655,064 | 10/1953 | Simon et al. | 81/99 |
| 4,554,944 | 11/1985 | Daghe et al. | 81/176 |

FOREIGN PATENT DOCUMENTS 216794 6/1924 United Kingdom ............. 81/176.15

Primary Examiner—Frederick R. Schmidt
Assistant Examiner—Bradley I. Vaught
Attorney, Agent, or Firm—Cushman, Darby & Cushman

[57] ABSTRACT

A tamperproof fire hydrant which can only be operated with use of a special operating means or tool thus preventing the opening of the hydrant by unauthorized persons for unauthorized use. The hydrant is provided with the usual polygonal end portion of the rotatable operating nut extending out of the top closure member. A dome shaped cap is mounted on the polygonal end portion of the operating nut for free rotation relative thereto, the dome shaped cap having a skirt with the lower edge thereof spaced from the tubular hold down nut or top closure member of the fire hydrant to provide a limited access space to the polygonal end portion for reception of the special operating means. The special operating means is also capable of being used as a tool to remove the nozzle cap off of the usual nozzle and to install the hose coupling on the nozzle.

6 Claims, 6 Drawing Figures

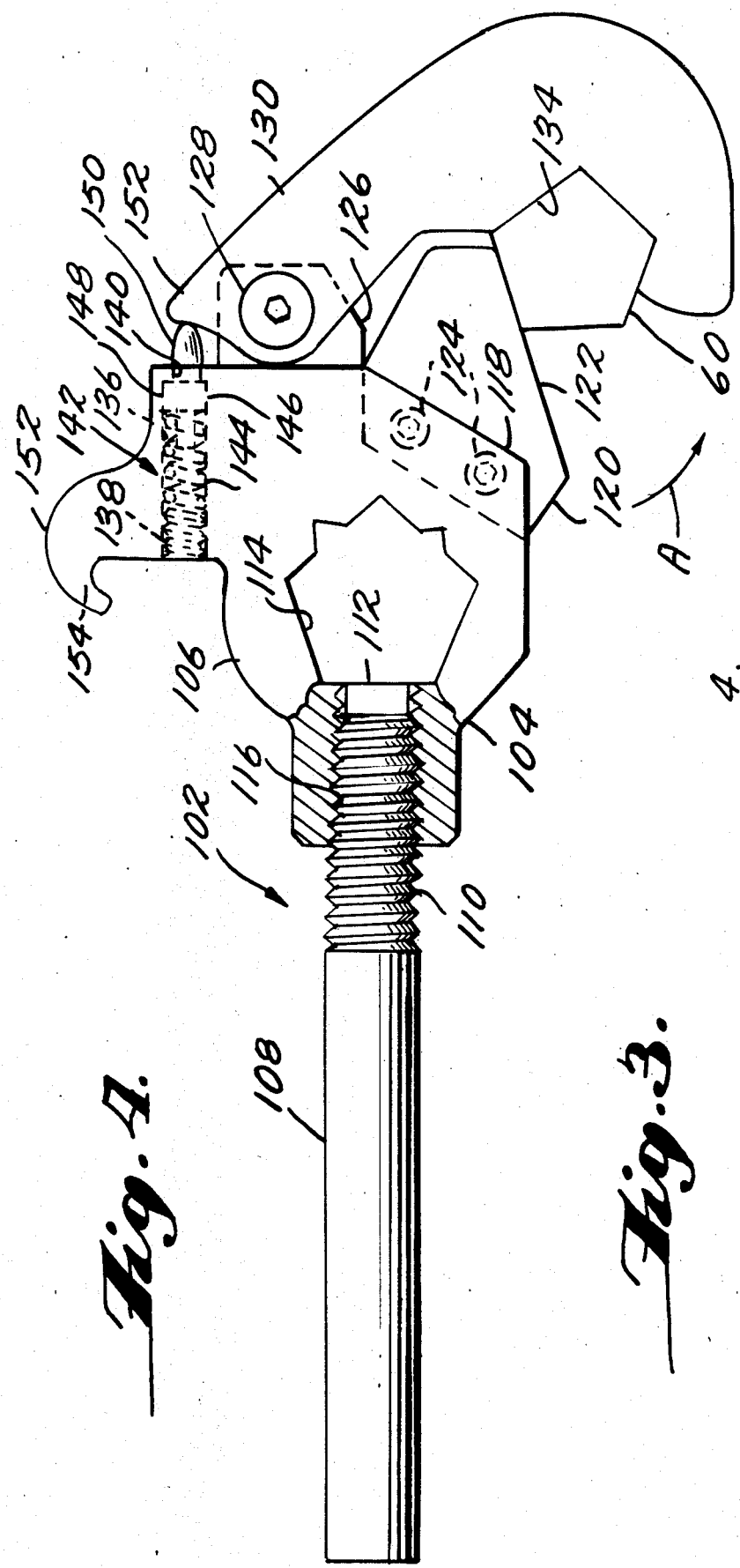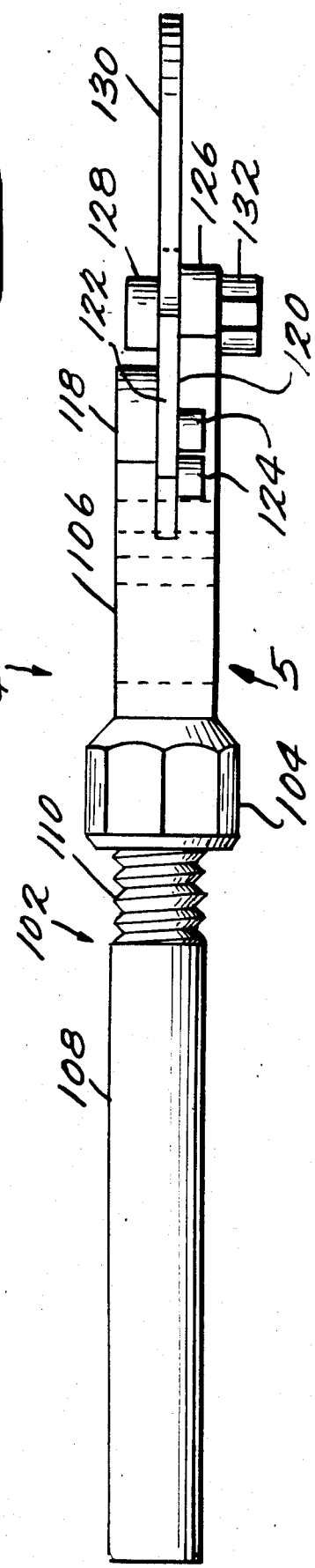

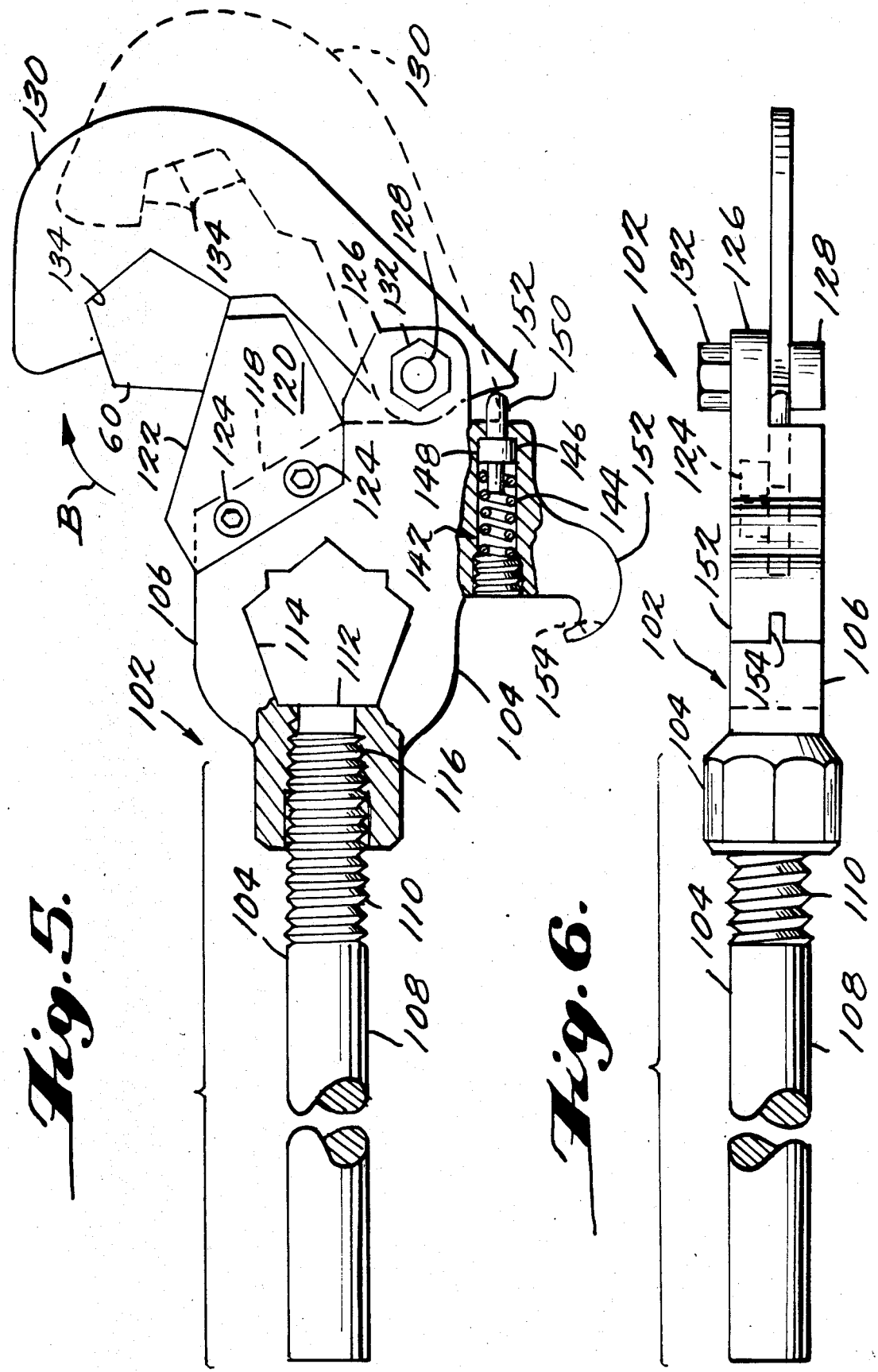

OPERATING WRENCH FOR TAMPERPROOF HYDRANTS

The present application is a continuation-in-part application of the copending U.S. application of DAGHE et al, Ser. No. 736,831, filed May 22, 1985, entitled OPERATING FOR TAMPERPROOF HYDRANTS and now U.S. Pat. No. 4,554,944 issued Nov. 26, 1985 to MUELLER CO. of Decatur, Ill. is the common assignee of this application and the aforementioned application Ser. No. 736,831.

FIELD OF THE INVENTION

The present invention relates to improvements in a tamperproof fire hydrant to prevent unauthorized use of the hydrant. More specifically, the present invention relates to a tamperproof hydrant provided with a dome shaped cap covering the polygonal end portion of the operating nut, the dome shaped cap being freely rotatable relative to the polygonal end portion. The dome shaped cap provides only limited access space to the polygonal end portion of the operating nut by a special operating means or device which is also capable of use to remove the hydrant nozzle caps off of the usual hydrant nozzles as well as for applying a hose coupling to the usual nozzle.

BACKGROUND OF THE INVENTION

In recent years, municipalities have found an increasing use of fire hydrants by unauthorized persons during hot weather, civil disturbances and the like. The unauthorized use causes considerable waste of water which is both costly and dangerous, especially when it taxes reservoirs and there may be a fire and the use of other fire hydrants are handicapped as the water pressure therein may be reduced.

Heretofore, efforts have been made to design tamperproof fire hydrants which required specially designed and manufactured fire hydrants, such hydrants requiring the utilization of special tools attached to operate the hydrants by depressing the valve stems vertically against water pressure to open hydrants. Additional structures have required special operating devices as the operating nut had a peculiarly shaped head. These types of tamperproof hydrants were costly to manufacture and required municipalities to spend a great deal of money replacing existing hydrants.

A second type of tamperproof hydrant utilizing a dome shaped cap to conceal the conventional polygonal end portion of the operating nut and leaving only limited access thereto was designed and required extensive modification of the fire hydrants at the site of use. While this type of tamperproof hydrant left only a limited access space to get at the polygonal end portion, the means for rotatably retaining the dome shaped cap operatively on the polygonal end portion of the operating nut included a modification with a number of parts including rigidly fixing a cylindrical member to the polygonal end portion by bolts. This arrangement was costly and if any of the bolts subsequently backed out of the cylindrical part, they would engage the flange of the dome shaped cap or the retaining ring preventing the cap from being freely rotatable.

An improved type of tamperproof hydrant utilizing a dome shaped cap freely rotatable on the polygonal end portion of the operating nut to provide a limited access space is disclosed in the copending U.S. application Ser. No. 736,830 filed May 22, 1985 by Wilbur R. Leopold, Jr. and Dennis W. Humes and entitled TAMPERPROOF FIRE HYDRANTS. This application has a common assignee, Mueller Co. of Decatur, Illinois and the subject matter of the same is incorporated by reference herein.

PRIOR ART

The following prior art patents generally relate to tamperproof hydrants requiring special operating means or tools:

| Number | Name | Issue Date |
|---|---|---|
| 572,035 | Stokes | Nov. 24, 1896 |
| 581,823 | Harrison | May 4, 1897 |
| 1,123,462 | Anderson | Jan. 5, 1915 |
| 1,465,009 | Wassetti | Aug. 14, 1923 |
| 3,070,115 | Jester | Dec. 25, 1962 |
| 3,453,655 | Quinones et al | Jul. 1, 1969 |
| 3,492,841 | Ipri | Feb. 3, 1970 |
| 3,532,108 | Sullivan | Oct. 6, 1970 |
| 3,532,109 | Smith | Oct. 6, 1970 |
| 3,709,249 | Diaz | Jan. 9, 1973 |
| Re. 27,616 | Diaz | Apr. 17, 1973 |
| 3,840,041 | McMurray | Oct. 8, 1974 |
| 3,935,877 | Franceschi | Feb. 3, 1976 |
| 4,083,377 | Luckenbill | Apr. 11, 1978 |
| 4,182,361 | Oakey | Jan. 8, 1980 |
| 4,398,556 | Pereira et al | Aug. 16, 1983 |

Reissue U.S. Pat. No. 27,616 discloses a protective device for fire hydrants which allows limited access of the polygonal end of the operating nut. To operate the hydrant of Reissue U.S. Pat. No. 27,616, a flat wrench of the pliers type having recesses in the jaws thereof for engaging the polygonal end portion of the operating nut was used. However, such a wrench could not be used to remove the nozzle cap for the usual nozzle of the hydrant barrel as the thinnest of the wrench was such it could not stand the treatment encountered or provide the necessary mechanical advantage or leverage. It has been found in practice, the nozzle caps are quite rigidly held onto the nozzle due to corrosion and require considerable force, including the jumping on the ends of the tools by the firemen or the striking of the ends of the tools with hammer to provide the necessary leverage.

U.S. Pat. No. 3,709,249 discloses a tamperproof fire hydrant similar to the Reissue U.S. Pat. No. 27,616 with the exception that a cylindrical part having a chordal face is rigidly secured to the polygonal end portion, the chordal face being exposed in the limited access space for reception of a wrench having a chordal face engaging the surface for mating with the chordal face of the cylindrical collar.

U.S. Pat. Nos. 3,532,108 and 3,532,109 disclose similar arrangements of tamperproof hydrants requiring a special tool attached to the hydrant for moving the valve stem vertically downwardly against water pressure.

U.S. Pat. No. 3,935,877 discloses a modification of a conventional hydrant having a cap housing with an exposed surface having major faces and minor faces so arranged as to require a complimentary tool clamped onto the same for operating the hydrant. The cap housing is rigidly retained on the polygonal portion of the operating nut or stem.

The remaining patents listed above are of general interest in that they show various tamperproof hydrant arrangements for operating the same.

BRIEF SUMMARY OF THE INVENTION

The present invention relates to a tamperproof hydrant including barrel means having the usual hydrant nozzles with hydrant nozzle caps thereon. The barrel means has an open end portion and valve means are positioned in the lower portion thereof with valve stem means extending upwardly from the valve means. A top closure member is secured to the open upper end of the barrel means, the top closure member being provided with an aperture therethrough. A rotatable operating nut is operatively connected to the valve stem for reciprocating the same. A polygonal end portion of the operating nut projects out of the aperture of the top closure member. A tubular hold down nut positions the operating nut against axial movement but permits rotary movement. A dome shaped cap covers the polygonal end portion of the operating nut, the dome shaped cap having a lower edge spaced from the upper end of the hold down nut to provide limited access space to the polygonal end portion of the operating nut. The dome shaped cap can rotate freely relative to the operating nut. Operating means are provided for fitting into the limited access space between the dome shaped cap and the hold down nut, the operating means having a thin movable jaw for receiving at least a portion of three sides of the polygonal end portion of the operating nut and a thin, fixed jaw opposing the movable jaw and engaging a fourth side of the polygonal end portion of the operating nut.

The thin movable jaw of the operating means is provided with three cooperating edge surfaces for engaging three sides of the polygonal end portion of the operating nut whereas the fixed jaw is provided with a single straight edge surface for engaging a fourth side of the polygonal end portion opposite the other three sides. By such an arrangement in utilizing the pivotal jaw with the fixed jaw having a straight surface, the operating means can have the straight surface slide into place against a side of the polygonal end portion of the operating nut while torque is being applied by the pivotal jaw and this increases the torque capability of the operating means while reducing the possibility of the operating means slipping and, thus, damaging the corners of the polygonal end portion of the operating nut. The pivotal jaw is spring urged toward the fixed jaw and thus when the operating means is applied to the polygonal end portion of the operating nut, it can rotate the nut in only one direction. When it is desired to rotate the nut in an opposite direction, the operating means is backed off of the polygonal end portion of the operating nut and is then turned over and reapplied so that the operating nut can be rotated in an opposite direction.

BRIEF DESCRIPTION OF THE DRAWINGS

FIG. 3 is a top plan view illustrating the operating means for the present invention;

FIG. 4 is a side elevational view partly in section of the operating means looking in direction of the arrow 4 of FIG. 3;

FIG. 5 is a side elevational view partly in section of the operating means looking in the direction of the arrow 5 of FIG. 3; and FIG. 6 is bottom plan of the operating means.

DETAILED DESCRIPTION OF THE INVENTION

Figure 1:
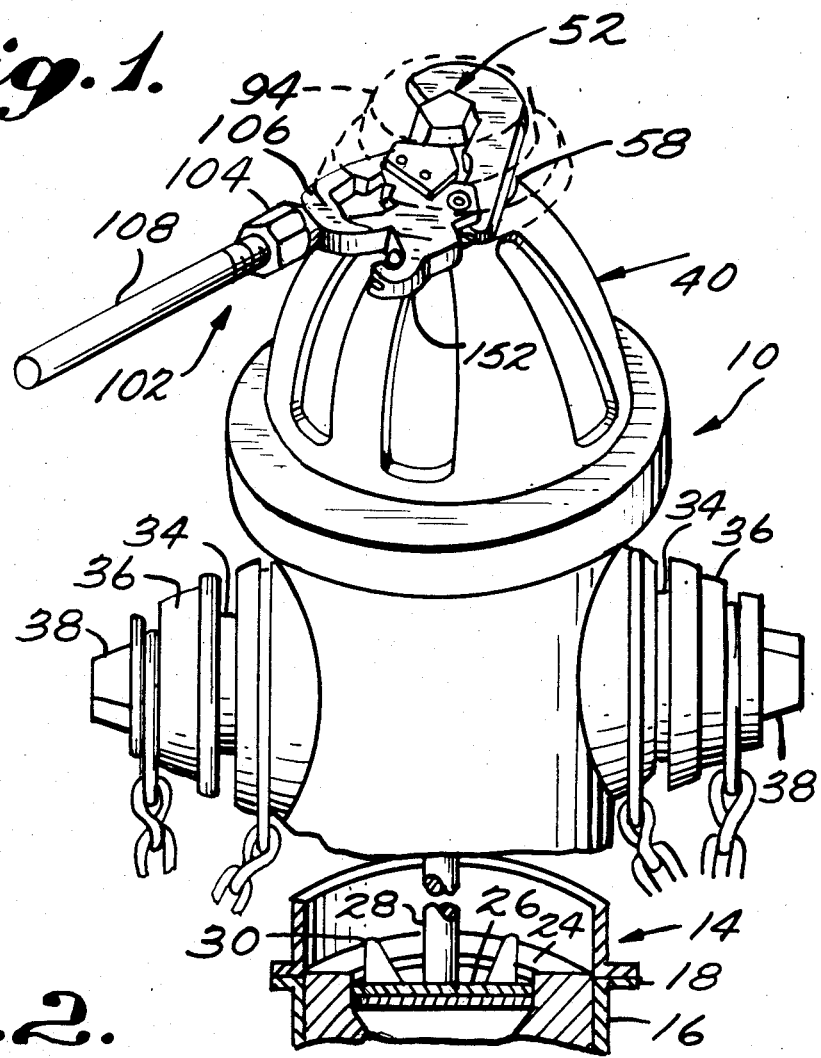
FIG. 1 is a fragmentary perspective view of a tamperproof hydrant of the present invention, the view being partly broken away to illustrate the valve means in the lower portion of the hydrant barrel and the operating means applied to the polygonal end portion in the limited access space.
Figure 2:
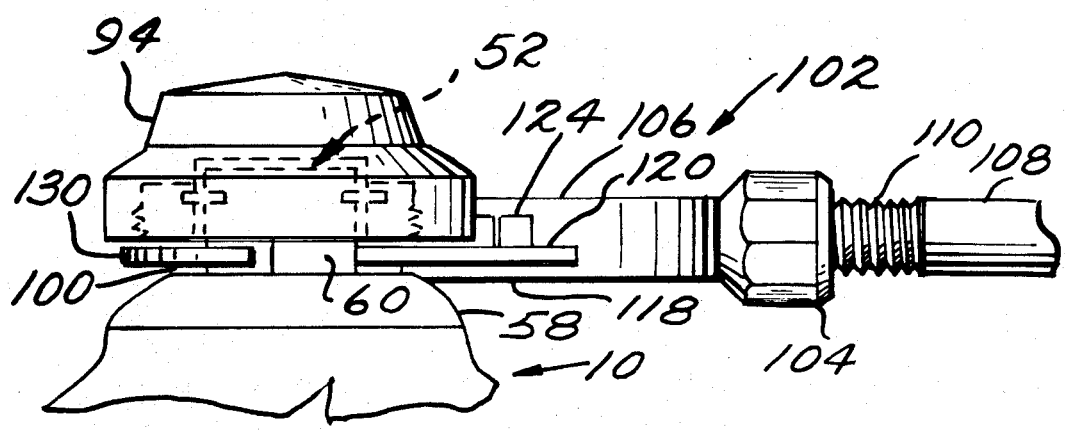
FIG. 2 is an enlarged fragmentary side elevation view of the top portion of the hydrant illustrating the tamperproof arrangement for the hydrant of the present invention and further illustrating the operating means applied to the polygonal end portion of the operating nut in the limited space between the dome shaped cap and the tubular hold-down nut.

Referring now to the drawings wherein like characters or reference numerals represent like or similar parts, the temperproof hydrant and the operating means of the present invention is illustrated in FIGS. 1 and 2 and is identified generally by the numeral 10. The hydrant 10 is adapted to be attached to a water main (not shown) and includes hydrant barrel means 14 comprising a shoe 16 having an upwardly open mouth surrounded by a peripheral flange 18. The hydrant barrel means may comprise one or more sections with the lowermost section being bolted to the flange 18 of the shoe 16. A main hydrant brass valve seat ring 24 cooperates with a reciprocating main valve element 26. The valve element 26 is provided with an upwardly extending valve stem means 28 and with upwardly extending rib elements 30 which cooperate with longitudinally extending grooves in the seat ring 24. As is now evident, the ribs 30 prevent the valve element 26 as well as the upwardly extending valve stem 28 from rotating but such ribs permit the valve element and the valve stem to reciprocate vertically.

The barrel means 14 is provided with at least one and preferably more hydrant nozzles 34, each of which is closed by a nozzle cap 36 detachably carried thereon. Each nozzle cap 36 is provided with a polygonal nut 38, preferably of pentagon shape.

The barrel means 14 has an open upper end portion for receiving a top closure member 40 which may be in the form of a bonnet shown herein and in U.S. Pat. No. 4,154,259 to Ellis et al issued May 15, 1979 or it may be in the form of the flat closure member shown in U.S. Pat. No. 4,083,377 to Luckenbill issued Apr. 11, 1978. In both instances, the top closure member 40 is provided with an aperture as shown in the aforementioned co-pending application of Leopold et al, Ser. No. 736,830, the aperture extending through the top closure member 40 from the exterior to the interior thereof.

The upper end of the valve stem 28 is similarly constructed to that of the aforementioned Leopold et al application Ser. No. 736,830 and it threadedly receives a rotatable operating nut 52 as best shown in FIGS. 1 and 2. The rotatable operating nut 52 has a polygonal end portion 60, preferably of pentagon shape extending out of the aperture as is conventional. In prior art arrangements of fire hydrants, a box end hydrant wrench was usually applied over the polygonal end portion 60 of the operating nut 52 for rotating the same to cause the valve stem means 28 to reciprocate vertically and, thus, open and close the hydrant.

To prevent the operating nut 52 from moving axially but permitting rotary movement of the same, there is provided a tubular hold down nut member 58 fully described in the aforementioned Leopold et al application Ser. No. 736,830.

As disclosed in the aforementioned Leopold et al application Ser. No. 736,830, the hydrant 10 is made tamperproof with respect to operation of the same by unauthorized persons by providing a dome shaped cap member 94 which is freely rotatably supported relative to the polygonal end portion 60 of the hold down nut 52. The dome shaped cap member 94 has a lower edge of its skirt closely spaced to the tubular hold down nut 58, thus, permitting only a limited access space 100 to the polygonal end portion 60 of the operating nut 52 and, thus, a conventional hydrant box wrench cannot be used.

Referring now to FIGS. 2–6, inclusive, there is disclosed an adjustable operating means 102 for operating the hydrant in the limited access space 100 as well as for removing the nozzle caps 36 from the nozzle 34. Additionally, the operating means 102 may also be used to apply a hose coupling with pins, as shown in DAGHE et al application Ser. No. 736,831, thereon to the hydrant nozzle 34 when the hydrant nozzle cap 36 has been removed. The operating means 102 engages one of the pins of the hose coupling and leverage can be applied thereto to thread the hose coupling onto the hydrant nozzle 34.

The body member 106 of the handle assembly 104 further includes a first flange 118 thinner in thickness than the body member, this flange having fixedly attached thereto a flat jaw part 120 with a planar edge surface 122 extending at an acute angle to the longitudinal axis of the handle assembly 104. The jaw part 120 is attached by socket head cap screws 124 or other suitable attachment means. The jaw part 120 has a thickness less than the limited access space 100 between the dome shaped cap 94 and the hold-down nut 58, as this jaw part 120 must be able to fit in the limited access space 100 and engage at least a substantial portion of one side of the polygonal end portion 60 of the operating nut 52.

Additionally, the body member 106 of the handle assembly 104 is provided with a forwardly extending tab 126, thinner in thickness than the body member 106. The tab 126 has an aperture therethrough for receiving a pivot pin hex socket head screw 128.

The operating means 102 includes a rugged handle assembly 104, comprising a body member 106 and an elongated rod-shaped member 108 having exterior threads 110 on one end thereof with a flat end surface 112. In more detail, the body member 106 has a polygonal aperture 114 extending therethrough and is provided with a threaded bore 116 opening to the polygonal aperture as evident from FIGS. 4 and 5, the elongated rod-shaped member 108 is threaded into the bore 116 with the flat end surface 112 opening into the aperture 114. The polygonal aperture 114 is utilized to remove the nozzle cap 36 by application to the polygonal nut 38. Adjustment for a particular size polygonal nozzle nut 38 can be made by rotating the elongated rod-shaped member 108 so that its flat end surface extends into the aperture 114, thus, changing the size of the same.

A flat hook-shaped jaw part 130 is pivotally retained on the tab 126 by inserting the screw 128 through an aperture in the same and through the aperture in the tab, and then a nut 132 is secured to the end of the screw.

The flat hook-shaped jaw part 130 has a thickness no greater than the thickness of the limited access space 100 between the dome shaped cap 94 and the hold-down nut 58. As will be evident from FIGS. 4 and 5, the pivotal flat hook-shaped jaw part is provided with co-operating edge surfaces 134 for engaging at least a portion of three other sides of the polygonal end portion 60 of the operating nut 52. The surfaces 134 generally face toward the flat planar surface 122 of the fixed jaw part 120 and when the polygonal end portion 60 is a pentagon, it will be noted from FIGS. 4 and 5, four sides of the end portion 60 are engaged by the fixed jaw part 120 and pivotal jaw part 130 with only a single side not being engaged.

The body member 106 is provided with a chamber 136 closed at one end by a retaining screw 138 and provided with a reduced diameter bore or opening 140 at the other end. The chamber 136 contains spring means 142 which includes a coil spring 144 engaging a head 146 of a detent 148. The detent 148 is provided with an end portion 150 which extends out of the reduced diameter bore or opening 140 and bears against an end portion 152 of the pivotal flat hook-shaped jaw part 130 so that the jaw part 130 is normally spring urged towards the fixed jaw part 120. By such an arrangement, the pivotal hook-shaped jaw part 130 can be pivoted away from the polygonal end portion 60 of the operating nut 52 when it is desired to remove the handle assembly 104 therefrom.

Referring again to FIGS. 4 and 5, it will be noted that in FIG. 4 the handle assembly 104 is properly connected to the polygonal end portion 60 of the operating nut 52 for rotating the operating nut in the direction of Arrow A. When it is desired to rotate the operating nut 52 in an opposite direction, the handle assembly 104 is rotated in a reverse direction to the Arrow A to remove the same from the end portion 60 as the hook-shaped jaw part 130 will pivot in a counterclockwise direction and thus the handle assembly can be easily removed therefrom. It is then turned over and reinstalled as shown in FIG. 5 for rotation of the polygonal end portion 60 of the operating nut 52 in the opposite direction shown by the Arrow B. FIG. 5 also shows in broken lines the pivotal movement of the hook-shaped jaw part 130 so that the handle assembly may be removed from the polygonal end portion 60 of the operating nut 52.

As mentioned at the outset, the handle assembly 104 can engage the polygonal end portion 60 of the operating nut 52 with less effort. By providing the straight flat surface 122 on the fixed jaw part 120, the jaw part can be slid into place and it will wedge tightly against the polygonal end portion 60 of the operating nut 52 when the hook-shaped jaw part 130 is pivoted by the spring means into engagement with three other sides of the polygonal end portion 60 of the operating nut 52 and torque is applied to the handle assembly 104. The arrangement increases the torque capability of the handle assembly and reduces the possibility of the handle assembly slipping and thus peening or damaging the corners of the polygonal end portion 60 of the operating nut 52.

The body member 104 is provided with an outwardly extending hook-shaped spanner arm 152 provided with a cutout 154. This hook-shaped spanner arm 152 is provided for engaging the pin of a hose coupling with the body member 106 engaging the peripheral portion of a hose coupling and the operation is substantially similar to that disclosed in the aforementioned copending application DAGHE et al Ser. No. 736,831.

By utilizing the operating means 102 as described above, it is not necessary for firemen to carry separate tools for turning the water off and on in the tamperproof hydrant, for removing nozzle caps and for attaching hose couplings. Ruggedness of the handle assembly 104 and particularly the body member 106 permits use of the operating means 102 in situations where there is difficulty in removing the nozzle cap and it requires an implement which can be jumped on by personnel or hammered to obtain the necessary torque. The portion of the operating means 102 utilized for turning the hydrant off and on could not be used in such situations as those just described, but there is sufficient rigidity in the jaw parts 120 and 130 to permit operation of the operating nut 52 without damage to the polygonal end portion 60 of the same.

The terminology used through the specification is for the purpose of description and not limitation, the scope of the invention being defined in the amended claims.

What is claimed is

1. A tamperproof fire hydrant comprising:
barrel means having an open upper end portion;
valve means in a lower portion of said barrel means;
valve stem means extending from said valve means upwardly within said barrel means;
a top closure member secured to the upper end section of said barrel means, said top closure member having an aperture therethrough;
a rotatable operating nut operatively connected to said valve stem means for reciprocating the same, said rotatable operating nut having a polygonal end portion projecting out of the aperture of said top closure member;
a tubular hold-down nut carried by said top closure member for positioning said rotatable operating nut against axial movement;
a dome shaped cap covering the polygonal end portion of said operating nut, said cap having a lower edge spaced from said hold-down nut to provide a limited access space to the polygonal end portion of said operating nut;
means supporting said dome shaped cap on said polygonal end portion of said operating nut for relative free rotation with respect thereto; and
operating means for rotating said polygonal end portion of said operating nut in said limited access space between said dome shaped cap and said hold-down nut, said operating means including a handle assembly having a fixed flat jaw part extending from one end of the same, said fixed flat jaw part having a thickness no greater than said limited access space between said dome shape cap member and said hold-down nut and having a straight planar edge surface extending at an acute angle to a longitudinal axis of said handle assembly for engaging at least a substantial portion of one side of said polygonal end portion, said handle assembly further having a flat hook-shaped jaw part pivotally connected thereto adjacent said fixed flat jaw part and projecting axially of the same, said pivotal flat hook-shaped jaw part having cooperating edge surfaces facing generally toward said planar edge surface of said fixed flat jaw part for engaging at least a portion of three other sides of said polygonal end portion of said operating nut, said pivotal flat hook-shaped jaw part having a thickness no greater than said limited access space between said dome shaped cap member and said hold-down nut, and spring means carried by said handle jaw part to normally urge said cooperating surfaces of the said pivotal flat hook-shaped jaw part toward said straight planar surface of said fixed jaw part when rotating said operating nut, said pivotal jaw and said fixed jaw thereby squeezing said end portion tightly without restraint, said spring means permitting said pivotal flat hook-shaped jaw part to be pivoted away from said polygonal end portion when said operating means is being removed.

2. A tamperproof fire hydrant as claimed in claim 1 wherein said handle assembly of said operating means includes a heavy body member at one end thereof to which said fixed flat jaw part is detachably connected and to which said pivotable hook-shaped jaw part is pivoted, said body member being of a thickness greater than the thickness of said fixed jaw part and said pivotable hook-shaped jaw part, said handle assembly further including an elongated rod-shaped member extending axially away from said body member in a direction away from said fixed jaw part and said pivotable jaw part.

3. A tamperproof fire hydrant as claimed in claim 2 wherein said body member includes a chamber therein and an aperture providing communication between said chamber and the exterior of said body member, and wherein said spring means includes a detent movable in said chamber and having an end portion extending through said aperture and spring bearing against said detent to normally urge said end of said detent outwardly against said pivotal jaw part.

4. A tamperproof fire hydrant as claimed in claim 2 wherein said body member has a polygonal aperture therethrough and a threaeed aperture communicating with said polygonal aperture, and wherein said rod-haped member has a threaded end portion with a flat end surface opening to said polygonal aperture, said rod-shaped member being capable of being threded into said polygonal aperture to adjust the same to accommodate different size polygonal nuts of hydrant nozzle caps.

5. A tamperproof fire hydrant as claimed in claim 2 including a hook-shaped spanner arm extending from said body member for use in engaging a pin on a hose coupling.

6. A tamperproof fire hydrant comprising:
barrel means having an open end portion;
valve means in a lower portion of said barrel means;
valve stem means extending from said valve means upwardly within said barrel means;
a top closure member secured to the upper end section of said barrel means, said top closure member having an aperture therethrough;
a rotatable operating nut operatively connected to said valve stem means for reciprocating the same, said rotatable operating nut having a polygonal end portion projecting out of the aperture of said top closure member;
a tubular hold-down nut carried by said to closure member for positioning said rotatable operating nut against axial movement;
a dome shaped cap covering the polygonal end portion of said operating nut, said cap having a lower edge spaced from said hold-down nut to provide a limited access space to the polygonal end portion of said operating nut;
means supporting said dome shaped cap on said polygonal end portion of said operating nut for relative free rotation with respect thereto; and
operating means for rotating said polygonal end portion of said operating nut in said limited access space between said dome shaped cap and said hold-down nut, said operating means including a handle assembly having a fixed flat jaw part extending from one end of the same, said fixed flat jaw part having cooperating surfaces spaced from and facing said handle assembly for engaging at least two sides of the polygonal end portion of said operating nut, said first flat hook-shaped jaw part having a thickness no greater than said limited access space between said dome shaped cap member and said hold-down nut, said handle assembly further having a second flat jaw part of a thickness no greater than the thickness of said first flat hook-shaped jaw part and having a single edge surface opposing said surfaces of aid first hook-shaped jaw part for engaging a further side of the polygonal end portion of said operating nut, one of said first flat hook-shaped jaw part and said second flat jaw part being movable toward the other and the other being fixed to handle assembly, said jaw parts being thereby movable into squeezing engagement without restraint with said operating nut.

* * * * *